United States Patent [19]

von Sothen et al.

[11] Patent Number: 4,661,660

[45] Date of Patent: Apr. 28, 1987

[54] CABLE DRUM DRIVEN BY AN ELECTRIC MOTOR

[75] Inventors: Heinrich F. von Sothen, Gerblingerode, Fed. Rep. of Germany; Leendert Visser, Papendrecht, Netherlands

[73] Assignee: Anton Piller GmbH & Co. KG, Osterode/Harz, Fed. Rep. of Germany

[21] Appl. No.: 773,921

[22] Filed: Sep. 6, 1985

[30] Foreign Application Priority Data

Oct. 23, 1984 [DE] Fed. Rep. of Germany ....... 3438749

[51] Int. Cl.$^4$ ............................................ H02G 11/02
[52] U.S. Cl. .......................... 191/12.2 A; 242/54 R; 242/85
[58] Field of Search ................ 191/12.2 R, 12.2 A, 191/12.4, 12 R; 242/85, 106, 107, 54 R

[56] References Cited

U.S. PATENT DOCUMENTS

| | | | |
|---|---|---|---|
| 1,729,781 | 10/1929 | Holmes | 191/12.2 A X |
| 2,108,111 | 2/1938 | Ehrlich | 191/12.2 R X |
| 2,141,909 | 12/1938 | Hauser | 242/107 |
| 2,572,856 | 10/1951 | Hallberg | 242/107 |
| 2,781,456 | 2/1957 | Buckeridge | 191/12.2 A X |
| 3,144,218 | 8/1964 | Tepe | 191/12.2 A X |
| 3,373,954 | 3/1968 | Hilsinger, Jr. | 242/107 |
| 4,384,688 | 5/1983 | Smith | 191/12.2 R X |
| 4,436,190 | 3/1984 | Wentzell | 191/12.2 R |

FOREIGN PATENT DOCUMENTS

| | | |
|---|---|---|
| G8419599.1 | 9/1984 | Fed. Rep. of Germany . |
| G8416520.0 | 10/1984 | Fed. Rep. of Germany . |
| 691817 | 5/1953 | United Kingdom ........... 191/12.2 R |

Primary Examiner—Robert B. Reeves
Assistant Examiner—David F. Hubbuch
Attorney, Agent, or Firm—Salter & Michaelson

[57] ABSTRACT

A cable drum 1 powered by an electric motor (2) for multi-conductor cables of heavy cross-section. To provide for insertion of the cable (4) into the cable drum (1) to be carried out without the use of slip-rings, twistable conductors (10) of high-elasticity are provided and are attached to rotate with the drum (1) at one end of a length L coaxial with the axis of rotation 1a of the drum (1). At the other end of the length L the conductors (10) are attached in a non-rotatable manner to a terminal box (15). The conductors (10) in the length L are guided between the points of attachment 12, 14 within a fixed tube (13). The terminal box (15) may be mounted on a slide 15a for movement in the axial direction of the tube and may be held under the tension of a spring (16) acting in the direction opposed to the movement. Alternatively the tube can be mounted at an angle to the axis of the rotation of the cable drum (1). When the tube (13) is mounted at an angle, the conductors (10) adjacent the cable drum (1) are enclosed in a flexible guide element which is attached at one end to the cable drum coaxially with the axis of rotation thereof and at the other end is mounted in a bearing so that the guide element can rotate, the axis of rotation of the bearing being coaxial with the axis of the tube.

12 Claims, 3 Drawing Figures

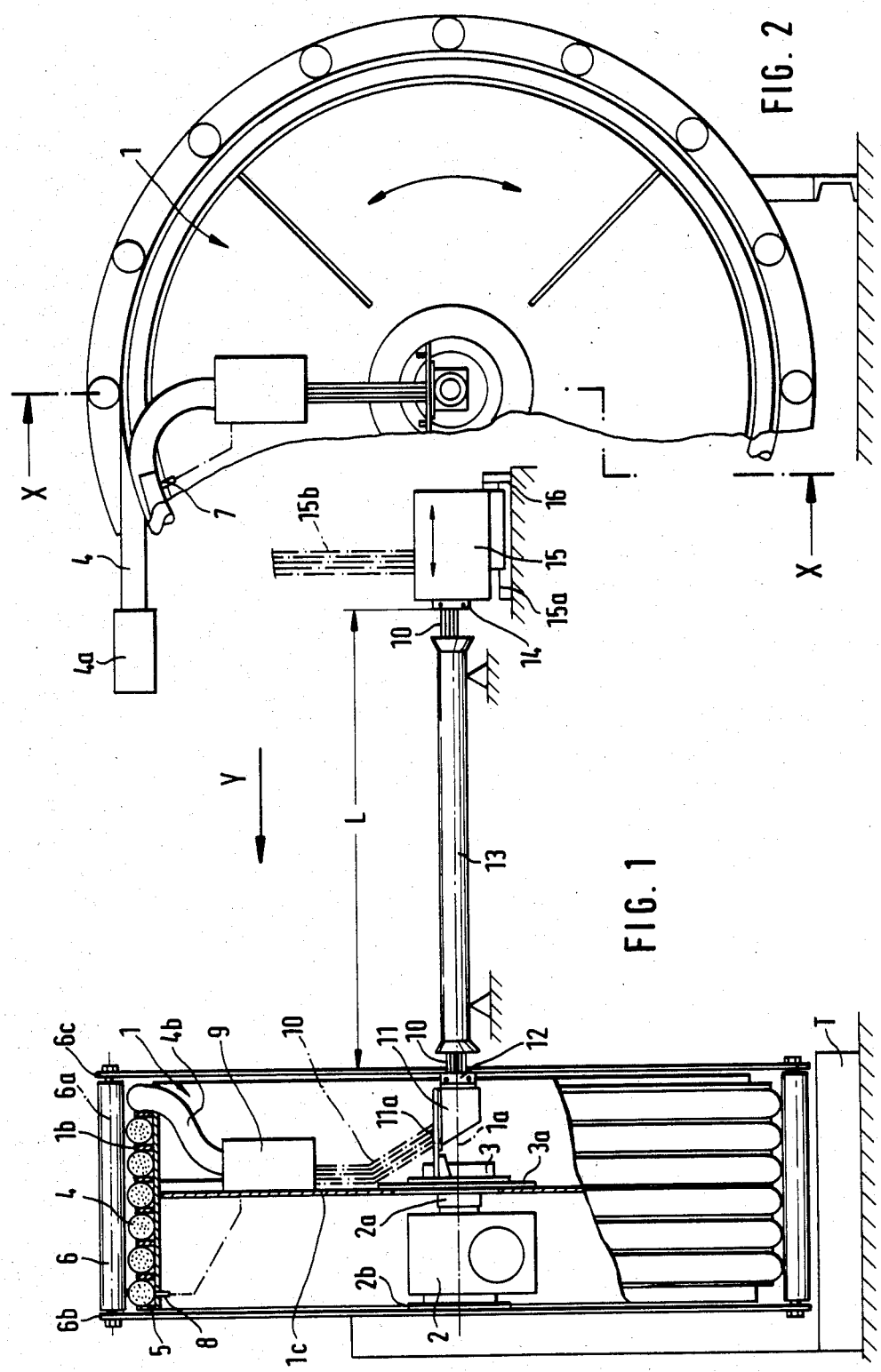

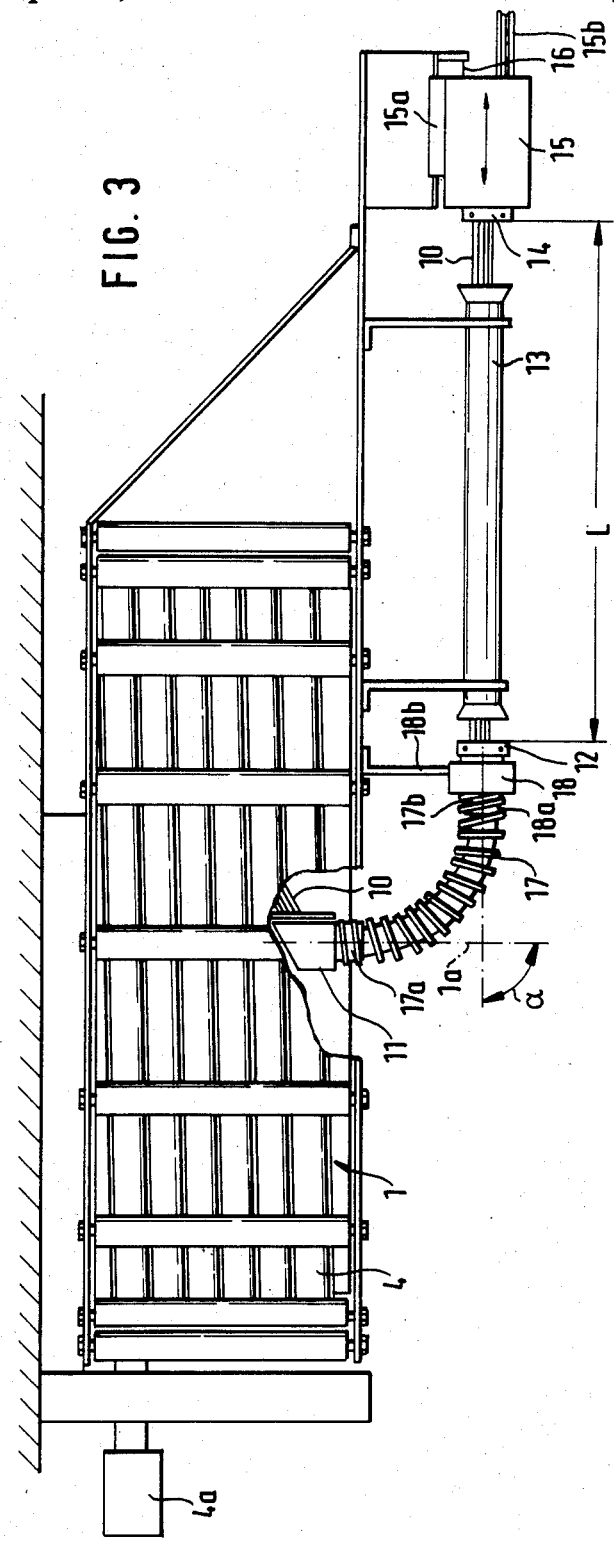

CABLE DRUM DRIVEN BY AN ELECTRIC MOTOR

The invention relates to a cable drum which is driven by an electric motor and which is intended for multi-conductor electric cable of heavy cross-section.

Cable drums of this type (which are also known as motorised cable drums) are used particularly for the power supply to mobile cranes and the like. The power supply cable, which is normally rubber-sheathed, is automatically wound in or paid out when the crane is moved. So-called "standstill motors" are used for the electric motors which are designed fo 100% constant rating. When the cable is drawn off, the motor is rotated in the opposite direction to the direction of its electrical rotation. On the release of the tension on the cable, the motor power acts to rewind the cable. With such cable drums, current is taken by the motor via slip rings.

The object of the invention is to provide a cable drum which is powered by an electric motor and for which a supply cable can be provided, particularly from the onboard mains system of an aircraft on the ground, with the cable being stowed in an orderly manner on the cable drum when it is not in use. The onboard mains supply of aircraft is 380 V, 400 Hz, 3-phase current. For this purpose it is necessary for the coupling cable to be connected to the drum using continuous permanent wiring—i.e., without using slip rings. The coupling cable in this case possesses in addition to the power conductors (e.g., seven conductors with a cross-section of 25 to 35 mm² each) several control conductors.

This object is achieved in accordance with the invention by a cable drum powered by an electric motor for multi-conductor cables of heavy cross-section in which twistable conductors of high-elasticity are used for the cable input into the drum, these conductors being attached to the cable drum for rotation with the drum at one end of a length over which the conductors are able to twist and at the other end of said length are attached in a non-rotatable manner to a terminal box, the conductors being guided in said length within a fixed tube between the points of attachment at each end of said length.

The terminal box may be so mounted that it can slide in the axial direction of the tube and be held in the direction away from the tube by a tension spring.

The tube may be arranged co-axially with the geometrical axis of the cable drum.

Alternatively the tube may be arranged at an angle to the geometrical axis of the cable drum, the conductors adjacent the cable drum being enclosed in a flexible guide element which is attached at one end to the cable drum coaxially with the axis of rotation of the drum and at the other end thereof is mounted in a bearing which permits the guide element to rotate, the axis rotation of the bearing being coaxial with the axis of the tube.

The cable drum may include a cylindrical reel having on its outer cylindrical surface a helical guide for the cable.

Limit switches may be provided at both ends of the helical guide, the sensors of the limit switches projecting outwardly from the cable bed on the outside of the reel.

A geared motor may be provided within the cable drum to drive the drum electrically, the cable drum being mounted on the motor output shaft.

The reel may be mounted on a transverse wall which is positioned approximately centrally of the reel in the axial direction thereof and by which the reel is attached to the output shaft of the geared motor. The transverse wall may be mounted on the output shaft of the geared motor via a friction clutch.

A terminal box for connecting conductors of the cable wound on the drum to the end of conductors of high-elasticity fixed to the drum may be provided within the cable drum at a distance from the axis of rotation of the drum.

The conductors of high-elasticity may be in the form of insulated braided stranded cables.

The invention is illustrated by way of example in the drawings and is described below with reference to the drawings, in which:

FIG. 1 shows a section along line X—X in FIG. 2 of a cable drum according to the invention.

FIG. 2 is a side view, partially broken, of the cable drum in FIG. 1, viewed in the direction of arrow Y.

FIG. 3 is a side view of a cable drum according to the invention having a vertical axis of rotation.

In the version shown in FIG. 1, the cable drum 1 has a horizontal geometrical axis of rotation 1a. The cable drum 1 is mounted on a support frame T via a geared motor 2 which is bolted onto the support frame T via its base plate 2b. The cable drum 1 is mounted on the output shaft 2a of the geared motor 2 and it is effective if this is carried out via a friction clutch 3.

The cable drum 1 includes a cylindrical cable reel 1b, which is mounted on a transverse wall 1c situated approximately at the centre of the reel 1b with respect to the axial length thereof. In this case, the transverse wall 1c is attached to the drive flange 3a of the friction clutch 3.

A helical cable guide 5 is fitted to the outside of the cable reel 1b and in the example shown, the guide 5 is formed from flat-profiled flanges on the reel 1b. In the case of cast cable drums, the helical cable guide may be in the form of hollows shaped to match the external diameter of the cable 4.

The cable 4 carries a plug 4a at one end. Its other end 4b is fed into a terminal box 9, which, in this case, is attached to the transverse wall 1c at some distance from the geometrical axis of rotation 1a of the drum. At intervals around the circumference of the cable drum 1 there are several rollers 6 which extend at right angles across the cable guide. The geometrical axes of rotation 6a of the rollers 6 are parallel to the geometrical axis of rotation 1a of the drum 1. The axles upon which the rollers 6 are mounted so as to enable them to rotate are in each case attached at one end (in FIG. 1 at the left-hand end) to a fixed plate or ring 6b and at the other end (the right-hand end) they are attached to a ring 6c which may be without radial support. The distance between the rollers 6 and the bed for the cable on the cable reel 1b is preferably somewhat greater than the diameter of the cable. In this way the cable is forced to lie in the helical guide during winding in and paying out. It is therefore not possible for the cable windings to move radially outward, that is to become loose on the reel. Consequently it is possible to wind even large-diameter cables onto cable drums of relatively small diameter.

On the cable 1b there are two limit switches 7, 8 one at each end of the two axial ends of the helical cable guide 5. The limit switches 7, 8 are provided with sensors which project through openings in the cable reel 1b outside the cable bed area within the helical cable guide 5. The geared motor 2 is switched off by the limit switch 8 when the cable is substantially completely wound onto the drum 1, thus preventing the plug 4a from becoming jammed between the cable reel 1b and a roller 6. The geared motor 2 is switched off by the limit switch 7 when the maximum available length of cable has been withdrawn from the cable drum 1. The geared motor 2 should preferably be switched on and off by means of a control cable or by a wire-less remote control. This makes it possible to with-draw a particular length required from the cable drum 1.

Supply to the cable drum 1 is by means of an input cable comprising a bundle of twistable conductors 10 of high elasticity, consisting of separate braided stranded conductors, each of which carries external insulation. These conductors can, for example, be flat stranded braided conductors for the power conductors. If control conductors are to be provided in addition, then these can be normal highly-flexible conductors with twisted strands.

One end of each of the conductors 10 is connected to the appropriate conductors of cable 4 in the terminal box 9. The conductors 10 are led from there into a diverter 11 which is situated at the axis of rotation 1a of the drum 1. At the outlet of the diverter 11, the conductors 10 are held by a mechanical clamping device 12 so that they cannot rotate relative to the diverter 11, and consequently also relative to the drum 1, on the tranverse wall 1c to which the diverter 11 is attached by means of a support 11a. The individual conductors 10 are then led in the direction of the axis 1a to a terminal box 15, the inlet of which is also provided with a mechanical clamping device 14 for the conductors 10 by which the conductors 10 are held so that they cannot rotate relative to the terinal box 15. Between these two clamping devices 12 and 14, the conductors 10 are twisted over a section L when the drum 1 is turned. The conductors 10 are guided in this section within a fixed tube 13.

The terminal box 15 is mounted on a straight guide 15a and is able to slide in the direction of the axis 1a of the drum. A tension spring 16 holds the terminal box 15 in the direction away from the tube 13 under the tension of the spring. Permanent conductors 15b which lead to the power supply, e.g., a converter or suitable supply mains, or in the case of control conductors to external control elements, are connected to the terminal box 15.

When the cable drum 1 is rotated to pay out or wind in the cable 4, the conductors 10 within the tube 13 are twisted between the two clamping devices 12 and 14. This twisting can be so arranged that the cable 10 is always twisted to the same degree at both terminal positions of the cable drum, but in the opposite directions of rotation. When half the cable 4 has been withdrawn from the drum 1, the conductors 10 will then be in an untwisted condition.

It is of course also possible, dependent upon circumstances, to provide for the twisting to be in the same direction of rotation.

Changes in length of the conductors 10 between the clamping devices 12 and 14, occurring as a result of the twisting, are accommodated by the sliding terminal box 15 which is under the tension of the spring 16. The connecting cable 15b is able to follow the relatively small movement of the terminal box 15 because the cable 15b is of sufficient length to enable it to move freely close to the terminal box 15.

The fixtures for mounting the tube 13 and the straight guide 15a of the terminal box 15 may be independent of the cable drum support frame T. These fixtures may, however, also be a part of the frame T.

In contrast to the version shown in FIG. 1, where the axis of rotation of the drum is horizontal, in the version shown in FIG. 3, the cable drum has a vertical axis of rotation, for mounting for example on the underside of a loading apron from which the onboard supply of an aircraft is to be provided by cable 4. In such an arrangement there may be difficulties in arranging the twisting section of the conductors 10, as shown in FIGS. 1 and 2, coaxially with the geometrical axis of rotation of the cable drum. To avoid these difficulties the tube 13 is, in this case, set at an angle α to the geometrical axis 1a of rotation of the drum 1. To facilitate this the diverter 11 on the drum 1 at one end 17a is attached to a flexible hollow guide element 17 which encloses the conductors 10. The other end 17b of the guide element 17 is attached to a rotatable member 18a, which is able to rotate in a bearing casing 18 which is fixed in position by means of a support 18b. The clamping device 12 for the conductors 10 associated with the cable drum 1 is positioned on the rotatable member 18a close to the tube 13. The guide element 17 may be, for example, a helical spring. It may also, however, be a corrugated or similar tube. By means of such a flexible guide element 17 any desired angle α up to approximately 90° may be selected. In other respects the cable drum in accordance with FIG. 3, including the twisting section L. is similar to the version shown in FIGS. 1 and 2.

What we claim as our invention and desire to secure by Letters Patent of the United States is:

1. A cable drum assembly comprising a drum, a multi-conductor cable of heavy cross section, means for rotating said drum to wind said multi-conductor cable thereon, an input cable comprising a bundle of twistable separately insulated braided stranded conductors of high elasticity, first terminal means on said drum connecting said input cable to said multi-conductor cable, means mechanically fixing said input cable to said drum along the geometrical axis of said drum so that one end of said input cable rotates with said drum, second terminal means nonrotatably securing the other end of said input cable with respect to said drum, a substantially straight guide tube, said input cable extending through said guide tube and being guided by said guide tube between said drum and said second terminal means, and means applying axial tension to said other end of said input cable in the axial direction of said guide tube away from said drum, so that said other end of said input cable is yieldable in the axial direction of said guide tube as said input cable is twisted.

2. A cable drum assembly according to claim 1 in which the tube is arranged coaxially with the geometrical axis of the cable drum.

3. A cable drum assembly according to claim 1 in which the cable drum includes a cylindrical reel having on its outer cylindrical surface a helical guide for the cable.

4. A cable drum assembly according to claim 1 in which the cable drum is surrounded on its outer periphery by fixed rollers which have axes of rotation parallel to the axis of rotation of the drum and which extend substantially across the width of the drum.

5. A cable drum assembly according to claim 1 in which said means for rotating the drum comprises an electric motor with an internal reduction gear provided within the cable drum, the cable drum being mounted on the output shaft of the reduction gear.

6. In the cable drum assembly of claim 5, said drum comprising a reel, and a radially extending wall which is attached to the output shaft of said geared motor and extends outwardly therefrom to a central position on said reel, said reel being attached to said wall and being thereby attached to said output shaft.

7. A cable drum assembly according to claim 6 in which the radially extending wall is mounted on the output shaft of the geared motor via a friction clutch.

8. In the cable drum assembly of claim 1, said cable drum comprising a reel, a helical guide for guiding said multiconductor cable on said reel as it is wound thereon, and limit switches at the opposite ends of said helical guide for controlling said rotating means, said limit switches including sensors which project outwardly from said reel for sensing said cable.

9. In the cable drum assembly of claim 1, said first terminal means comprising a terminal box mounted on the cable drum in radially spaced relation to the axis thereof.

10. In the cable drum assembly of claim 1, said second terminal means being spaced from the geometrical axis of said drum.

11. A cable drum assembly comprising a drum, a multi-conductor cable of heady cross section, means for rotating said drum to wind said multi-conductor cable thereon, an input cable comprising a bundle of twistable separately insulated braided stranded conductors of high elasticity, first terminal means on said drum connecting said input cable to said multi-conductor cable, means mechanically fixing said input cable to said drum along the geometrical axis of said drum so that one end of said input cable rotates with said drum, second terminal means including a terminal box nonrotatably securing the other end of said input cable with respect to said drum, a substantially straight guide tube, said input cable extending through said guide tube and being guided by said guide tube between said drum and said terminal bar, and means mounting said terminal box so that it is slidable in the axial direction of said guide tube and biased in the direction away from said guide tube.

12. A cable drum assembly comprising a drum, a multi-conductor cable of heavy cross section, means for rotating said drum to wind said multi-conductor cable thereon, an input cable comprising a bundle of twistable separately insulated braided stranded conductors of high elasticity, first terminal means on said drum connecting said input cable to said multi-conductor cable, means mechanically fixing said input cable to said drum along the geometrical axis of said drum so that one end of said input cable rotates with said drum, second terminal means nonrotatably securing the other end of said input cable with respect to said drum, a substantially straight guide tube, said input cable extending through said guide tube and being guided by said guide tube between said drum and said second terminal means, and means applying axial tension to said input cable in the axial direction of said guide tube away from said drum, said guide tube being disposed at an angle to the geometrical axis of said cable drum, said assembly further comprising a tubular flexible guide element interposed between said cable drum and said guide tube, said guide element being secured at one end thereof to said cable drum in substantially coaxial relation to the axis thereof and rotatably secured at the other end thereof to said guide tube in substantially aligned relation therewith, said input cable passing through said guide element.

* * * * *